United States Patent [19]

Bell

[11] Patent Number: 4,698,369

[45] Date of Patent: Oct. 6, 1987

[54] FLEXIBLE, FLAME-RETARDANT POLYURETHANE FOAMS

[75] Inventor: Raymond W. H. Bell, Crickhowell, Wales

[73] Assignee: Dunlop Limited a British Company, United Kingdom

[21] Appl. No.: 875,705

[22] Filed: Jun. 18, 1986

[51] Int. Cl.$^4$ ............................................. C08G 18/14
[52] U.S. Cl. ..................................... 521/99; 521/103; 521/106; 521/123; 521/132; 521/906
[58] Field of Search ................. 521/99, 103, 106, 123, 521/132, 906

[56] References Cited

U.S. PATENT DOCUMENTS

| | | | |
|---|---|---|---|
| 3,574,644 | 4/1971 | Olstowski et al. | 106/15 |
| 4,390,656 | 6/1983 | Weise et al. | 524/493 |
| 4,438,221 | 3/1984 | Fracalossi et al. | 521/99 |

FOREIGN PATENT DOCUMENTS

| | | |
|---|---|---|
| 0009109 | 9/1981 | European Pat. Off. . |
| 0051347 | 5/1982 | European Pat. Off. . |
| 1038871 | 1/1964 | United Kingdom . |
| 1069919 | 5/1967 | United Kingdom . |
| 1194766 | 6/1970 | United Kingdom . |
| 1284676 | 8/1972 | United Kingdom . |
| 1359734 | 7/1974 | United Kingdom . |
| 1404822 | 9/1975 | United Kingdom . |
| 1497118 | 1/1978 | United Kingdom . |
| 2012296 | 7/1979 | United Kingdom . |
| 2064986 | 6/1981 | United Kingdom . |

OTHER PUBLICATIONS

Chemical Abstracts, vol. 85, No. 16, Abstract No. 109453F, 1976.

*Primary Examiner*—Maurice J. Welsh
*Attorney, Agent, or Firm*—Stevens, Davis, Miller & Mosher

[57] ABSTRACT

Flexible polyurethane foams are used for a wide variety of applications including upholstery and bedding. Unfortunately polyurethane foams are inherently flammable. The invention overcomes this problem by using expandable graphite in the polyurethane foam-forming reaction mixture to improve the burning characteristics of the final foam. Expandable graphite is graphite containing one or more exfoliating agents so that considerable expansion will occur at high temperatures.

12 Claims, No Drawings

FLEXIBLE, FLAME-RETARDANT POLYURETHANE FOAMS

This invention relates to a method for the production of flexible, flame-retardant polyurethane foams and to novel foams obtained thereby.

The term "flexible" as used herein includes, but is not restricted to, the categories of foams known to those skilled in the art as "low-resilience", "conventional" and "high-resilience" foams. Flexible cellular materials have been interpreted by the International Standards Organisation (I,S.O.) TC.45 (Cellular Plastics Committee) as "Cellular polymeric materials capable of significant deflection and recovery or used in applications requiring significant deflection and recovery."

The physical and mechanical properties of polyurethane foams make them useful for a wide variety of applications, including upholstery and bedding. However, polyurethane foams are inherently flammable and this leads to melting and spread of burning debris and (in the case of "conventional" foams) may also lead to the sustaining of combustion by progressive smouldering even after the actual flames have extinguished.

It is considered that cellular materials manufactured from flammable polymers are more flammable than the solid materials because the insulating effect of their cellular nature allows a rapid build-up of heat at the heating surface with a consequence high rate of pyrolysis. In solid materials this heat build-up is at a lower rate because of the higher conductivity of the solid material. Although rigid foams have similar thermal conductivity behaviour to flexible foams, the high cross-linked nature of their chemical structure makes them less flammable as polymers and also inherently more inclined to form a protective char rather than to form the flaming molten polymer droplets which occur with flexible foams. Thus both solid and rigid cellular materials burn less easily than flexible foams and are easier to extinguish.

The object of this invention is to make flexible polyurethane foams behave more like rigid foams and thus produce a protective char with little or no burning melt or drips. This is achieved by including a particular type of graphite in the foam-forming reaction mixture.

According to one aspect of the present invention there is provided a method for the production of a flexible flame-retardant polyurethane foam from a foam-forming reaction mixture including a polymeric polyol and an organic polyisocyanate characterised in that the foam-forming reaction mixture also contains expandable graphite as hereinafter defined.

According to a further aspect of the present invention a flexible flame-retardant polyurethane foam comprises the reaction product of a polymeric polyol and an organic polyisocyanate characterised in that the foam contains expandable graphite as hereinafter defined.

The conditions needed to produce a flexible foam will vary according to the reactants selected. A person of ordinary skill in the art will know whether to include additives eg a catalyst or a blowing agent and what reaction conditions are required. The molecular weights of the polymeric polyols used in flexible foam manufacture are usually from 1000 to 10,000, preferably from 3000 to 7000, with a functionality of up to 4, preferably 2 to 3. The functionality of the polyisocyanate is usually at least 2.

By "expandable graphite" is meant graphite containing one or more exfoliating agents such that considerable expansion will occur at high temperatures.

The foam-forming reaction mixture usually contains graphite in an amount such that there will be at least 10% by weight, preferably at least 15% by weight and advantageously at least 25% by weight of graphite in the final foam. The amount of graphite required will depend upon the degree of flame retardance required of the foam but usually the amount of graphite will not exceed 30% by weight in the final foam.

The graphite may comprise the sole flame-retardant additive in the foam-forming reaction mixture.

Alternatively, other flame-retardant ingredients, known per se, may be used in addition to the graphite. Examples of such ingredients include the hydrated aluminas (eg BACO* FRF 40) and halogen and/or phosphorus-containing compounds, or antimony oxides, or boron-containing compounds.

*BACO is a Registered Trade Mark.

If desired, intumescent-generating ingredients, eg ammonium polyphosphates, may be included in the foam-forming reaction mixture.

Usually the foams produced according to the present invention will pass the burning test described in the British Standard specification No. 4735 September 1974. Usually the foams of the present invention are sufficiently flame-retardant that if used with selected textile cover materials the resulting combinations would pass the No. 4 crib test of the British Standard specification BS 5852: Part 2: 1982, preferably the No. 5 crib test, more preferably the No. 6 crib test and advantageously the No. 7 crib test. In view of the varying degree of flammability of different textile materials it is impossible to give absolute directions as to which textile materials are to be selected. However, a person of ordinary skill in the art would know which materials are likely to be suitable and simple trial and error would then establish whether they were indeed suitable. In order to prepare a foam capable of passing the No. 7 crib test it would generally be necessary for the amount of expendable graphite in the foam to be at least 25% by weight.

The present invention will be illustrated by way of the following Examples.

I: LOW RESILIENCE FOAMS

EXAMPLES 1 TO 3

Free-rise, low-resilience polyurethane foams were made from the formulations shown in TABLE A (overleaf). (Quantities are parts by weight).

TABLE A

| Ingredient (see notes below) | CONTROL X | CONTROL Y | EXAMPLE 1 | EXAMPLE 2 | EXAMPLE 3 |
|---|---|---|---|---|---|
| Polymeric polyol (a) | 100 | 100 | 100 | 100 | 100 |
| Water | 0.8 | 0.8 | 0.8 | 0.8 | 0.8 |
| Glycerol | 2.5 | 2.5 | 2.5 | 2.5 | 2.5 |
| Amine catalyst (b) | 2.3 | 2.3 | 2.3 | 2.3 | 2.3 |
| Surfactant (c) | 0.67 | 0.67 | 0.67 | 0.67 | 0.67 |
| Polybutene (d) | 17 | 17 | 17 | 8.5 | 8.5 |
| Dimethyl Ethanolamine catalyst (e) | 0.3 | 0.3 | 0.3 | 0.3 | 0.3 |
| Alumina hydrate (f) | — | 40 | — | — | — |
| Expandable Fine grade | — | — | 40 | 20 | — |

TABLE A-continued

| Ingredient (see notes below) | CONTROL X | CONTROL Y | EXAMPLE 1 | EXAMPLE 2 | EXAMPLE 3 |
|---|---|---|---|---|---|
| graphite Expandable Coarse grade graphite | — | — | — | — | 20 |
| Blowing agent (g) | — | — | 5 | 5 | 5 |
| Polyisocyanate (h) | 50 | 50 | 50 | 50 | 50 |

Notes to TABLE A
(a) A polyether polyol, available from Lankro Chemicals Limited as G 1000.
(b) Triethylene diamine, available from Air Products Limited as DABCO 33 LV (DABCO is a Registered Trade Mark).
(c) A polyalkylene oxide polysiloxane silicone copolymer, available from B P Chemicals Limited as SC 246.
(d) Available from B P Chemicals Limited as HYVIS 5 (HYVIS is a Registered Trade Mark).
(e) Dimethylethanolamine, available from Diamond Shamrock Limited as PROPAMINE A: (PROPAMINE is a Registered Trade Mark).
(f) Available from British Aluminium Co Limited as BACO FRF 40 (BACO is a Registered Trade Mark).
(g) A fluorocarbon blowing agent, available from I.C.I. Limited as ARCTON 11.
(h) A 20:80 mixture of methylene-bis-2,4-phenyldiisocyanate (M.D.I.) and tolylene diisocyanate (T.D.I.) available from B P Chemicals Limited as I 13-17.

Samples of each of the above foams were subjected to the burning tests described in British Standards Specification No 4735 and the results were as follows:

CONTROL X: Average burn length 125 mm in 121 seconds, i.e. the whole sample was burnt.

CONTROL Y: The addition of alumina hydrate gave only a slight improvement, the average burn length of this sample being 125 mm in 159 seconds.

EXAMPLE 1: Average burn length using 40 php fine-grade graphite was 38 mm in 113 seconds. The foam charred (as opposed to the foam of the two CONTROL examples which melted and dripped).

EXAMPLE 2: Reduction of the polybutene level and of the graphite level to 8.5 php and 20 php respectively led to an average burn length of 40 mm in 133 seconds.

EXAMPLE 3: Substitution of coarse-grade graphite (20 php) in the formulation of EXAMPLE 2 produced an average burn length of 42 mm in 120 seconds, i.e. not significantly different from that of EXAMPLE 2.

The formulations of CONTROL EXAMPLE X and of EXAMPLES 1 and 2 (above) were also moulded and the resultant mouldings tested according to British Standards Specification No. 2782, Method 141 (Oxygen Index Test). The following results were obtained:

| Example | Oxygen Index |
|---|---|
| CONTROL X | 23.8 |
| EXAMPLE 1 | 33 |
| EXAMPLE 2 | 30.5 |

II: CONVENTIONAL FOAMS

EXAMPLES 4 TO 6

Conventional polyurethane foams were made by moulding the formulations shown in TABLE B (below) followed by curing for 14 minutes at 150° C. (Quantities are parts by weight).

TABLE B

| Ingredient (see notes below) | EXAMPLE 4 | EXAMPLE 5 | EXAMPLE 6 |
|---|---|---|---|
| Polymeric polyol (a) | 600 | 600 | 600 |
| Water | 7.5 | 7.5 | 7.5 |
| Amine catalyst (b) | 5 | 5 | 5 |
| N—ethylmorpholine | 3.5 | 3.5 | 3.5 |
| Surfactant (c) | 0.6 | 0.6 | 0.6 |
| Graphite (d) | 120 | 120 | 240 |
| F.R. additive (e) | — | 60 | — |
| Polyisocyanate (f) | 115 | 115 | 115 |

Notes to TABLE B
(a) A polyoxyethylene/polyoxypropylene triol, of approximate molecular weight 3500, having a high proportion of terminal primary hydroxyl groups.
(b) DABCO 33 LV (see TABLE A)
(c) SC246 (see TABLE A)
(d) Fine grade expandable graphite.
(e) A material containing chlorine and phosphorus, available from Tenneco Organics Limited as TOLGARD V6 (TOLGARD is a Registered Trade Mark).
(f) An 80:20 mixture of the 2,4 - and 2,6 - isomers of tolylene diisocyanate (T.D.I.).

Samples of each of the above foams were tested according to the various crib tests described in British Standards Specification No. 5852, Part 2, the weights of the wooden cribs being as follows:

No. 4 crib: 8.5 g;
No. 5 crib: 17 g;
No. 6 crib: 60 g.

EXAMPLE 4: A No. 4 crib was placed directly on the top surface of the moulding and ignited.
  Burning time of crib: 3½ minutes
  Flaming of foam ceased: 6 minutes
  Progressive smouldering: None EXAMPLE 5: As EXAMPLE 4, but with No. 5 crib.
  Burning time of crib: 4 minutes
  Flaming of foam ceased: 6 minutes
  Progressive smouldering: None EXAMPLE 6: As EXAMPLE 4, but with No. 6 crib.
  Burning time of crib: 8 minutes
  Flaming of foam ceased: 11 minutes
  Progressive smouldering: None

III: HIGH-RESILIENCE FOAMS

EXAMPLES 7 AND 8

High-resilience foams were made by moulding the formulations shown in TABLES C and D (below) in a mould at 50° C., followed by curing for 10 minutes at room temperature. (Quantities are parts by weight).

TABLE C

| Ingredient (see notes below) | EXAMPLE 7 |
|---|---|
| Polymeric polyol (a) | 100 |
| Water | 2.5 |
| Surfactant (b) | 0.9 |
| Amine catalyst (c) | 1.2 |
| Tertiary amine catalyst (d) | 0.2 |
| Blowing agent (e) | 10 |
| Dibutyltin dilaurate | 0.03 |
| Graphite (f) | 20 |
| Chlorinated paraffin (g) | 10 |

TABLE C-continued

| Ingredient (see notes below) | EXAMPLE 7 |
|---|---|
| Polyisocyanate (h) | 60 |

Notes to TABLE C
(a) A polyoxypropylene polyoxyethylene triol of approximate molecular weight 6000, having a high proportion of terminal primary hydroxyl groups and available from Bayer AG under the reference 7963.
(b) A silicone surfactant, available from Goldschmidt AG under the reference B8629.
(c) DABCO 33 LV (see TABLE A)
(d) Available from Union Carbide under the reference A1
(e) ARCTON 11 (see TABLE A)
(f) Fine grade expandable graphite
(g) Available from I.C.I. Limited as CERECLOR S52 (CERECLOR is a Registered Trade Mark)
(h) A modified MDI, available from I.C.I. Limited under the reference VM 25.

A sample of this foam was tested using a No. 5 crib.
Burning time of crib: 3½ minutes
Flaming of foam ceased: 6 minutes
Emission of smoke ceased: 20 minutes
Progressive smouldering: None

TABLE D

| Ingredient (see notes below) | EXAMPLE 8 |
|---|---|
| Polymeric polyol (a) | 100 |
| Cross-linking agent (b) | 6 |
| Water | 8 |
| Amine catalyst (c) | 1.2 |
| Tertiary amine catalyst (d) | 0.2 |
| Surfactant (e) | 0.9 |
| Graphite (f) | 20 |
| Chlorine/phosphorus compound (g) | 10 |
| Dibutyl tin dilaurate | 0.03 |
| Polyisocyanate (h) | 41.5 |

Notes to TABLE D
(a) Polyol 7963 (See TABLE C)
(b) Available from Lankro Chemicals Limited under the reference A260
(c) DABCO 33 LV (see TABLE A)
(d) A1 (see TABLE C)
(e) B8629 (see TABLE C)
(f) Fine grade expandible graphite
(g) TOLGARD V6 (see TABLE B)
(h) I 13-17 (see TABLE A)

A sample of this foam was also tested using a No. 5 crib.
Burning time of crib: 5 minutes
Emission of smoke ceased: 13 minutes
Progressive smouldering: None

EXAMPLES 9 AND 10

High-resilience foams were made by including formulations as shown in Table E in a mould at 45° C. followed by curing for 10 minutes at room temperature. (Quantities are parts by weight).

TABLE E

| Ingredient | Examples 9 and 10 |
|---|---|
| Polymeric polyol (a) | 50 |
| Polymeric polyol (b) | 50 |
| Water | 3.2 |
| Amine catalyst (c) | 3 |
| Tertiary Amine Catalyst (d) | 0.2 |
| Surfactant (e) | 0.6 |
| Expandable graphite | 43.7 |
| Sodium tetra borate decahydrate | 5 |
| Polyisocyanate (f) | 75 |

Notes to Table E
(a) A polyoxypropylene polyoxyethylene triol of approximate molecular weight 6000, having a high proportion of terminal primary hydroxyl groups and available from Bayer AG under the reference 7963.
(b) Available from B P Chemical Limited under the reference U1315
(c) Triethylene diamine, available from Air Products Limited as DABCO 33LV
(d) Available from Union Carbide under the reference NiAX A1
(e) Polyalkylene oxide polydimethyl siloxane silicone available under the reference B4113
(f) Modified diphenyl methane diisocyanate available from ICI under reference VM25.

For Example 9, foam was tested in combination with a woollen fabric of weight approximately 400 g/m$^2$ using a No. 6 wooden crib (weight 60 g) according to BS 5852 Part 2, 1982. Flaming of the foam/fabric combination ceased 11.5 minutes from the ignition of the wooden crib and there was no progressive smouldering revealed by examination one hour after ignition. The weight loss shown by the foam component was about 3%.

For Example 10, foam was tested in combination with a wool moquette fabric of weight approximately 800 g/m$^2$ using a No. 7 wooden crib (weight 120 g) according to BS 5852 Part 2 1982. Flaming of the foam/fabric combination ceased 15 minutes from ignition of the crib. There was no progressive smouldering.

EXAMPLE 11

A conventional polyether polyurethane foam, similar to those described in EXAMPLES 4 to 6 but containing 30% by weight of graphite and having a foam density of 36 Kg/m$^3$, was tested in the F.A.A. Kerosene Burner Test* in combination with a 100% wool face fabric and a partially-carbonised viscose interliner. It was found that this combination self-extinguished 3.5 minutes after the commencement of the test and that the overall weight loss was 6.8%.

*Federal Aviation Administration;
14 CFR Parts 25, 29 and 121;
Flammability Requirements for Aircraft Seat Cushions;
Final Rule.

What is claimed is:

1. A method for the production of a flexible, flame-retardant polyurethane foam by reacting in a foam-forming reaction mixture a polymeric polyol, an organic polyisocyanate and an effective amount of expandable graphite, wherein said expandable graphite contains one or more exfoliating agents.

2. The method of claim 1, wherein the amount of said expandable graphite in said foam-forming reaction mixture is such that the resulting foam contains at least 10% by weight of said expandable graphite.

3. The method of claim 1, wherein the amount of said graphite in said foam-forming reaction mixture is such that the resulting foam contains at least 15% by weight of said expandable graphite.

4. The method of claim 1, wherein the amount of said graphite in said foam-forming reaction mixture is such that the resulting foam contains at least 25% by weight of said expandable graphite.

5. The method of claim 1, wherein said foam-forming reaction mixture also contains a flame-retardant ingredient selected from the group consisting of hydrated aluminas, halogen-containing compounds, phosphorous-containing compounds, compounds containing halogen and phosphorous, antimony oxides and boron compounds.

6. The method of claim 1, wherein said foam-forming reaction mixture also contains an intumescing ingredient.

7. The method of claim 6, wherein said intumescing ingredient is an ammonium polyphosphate.

8. A flexible, flame-retardant polyurethane foam, said foam being the reaction product under foam-forming conditions of a polymeric polyol, an organic polyisocyanate and an effective amount of expandable graphite, said expandable graphite containing one or moe exfoliating agents.

9. The foam of claim 8 which passes the burning test of British Standard Specification No. 4735, September 1974.

10. The foam of claim 8 which when used in combination with a textile cover passes the No. 7 crib test of British Standard Specification No. 5852, Part 2, 1982.

11. The foam of claim 1 wherein the polymeric polyol is a polyether polyol.

12. The foam of claim 8 wherein said foam is the reaction product under foam-forming conditions of a polyether polyol, an organic polyisocyanate and an effective amount of expandable graphite, said expandable graphite containing one or more exfolidating agents.

* * * * *